E. T. HOPKINS.
CAR-COUPLING.
No. 187,856. Patented Feb. 27, 1877.
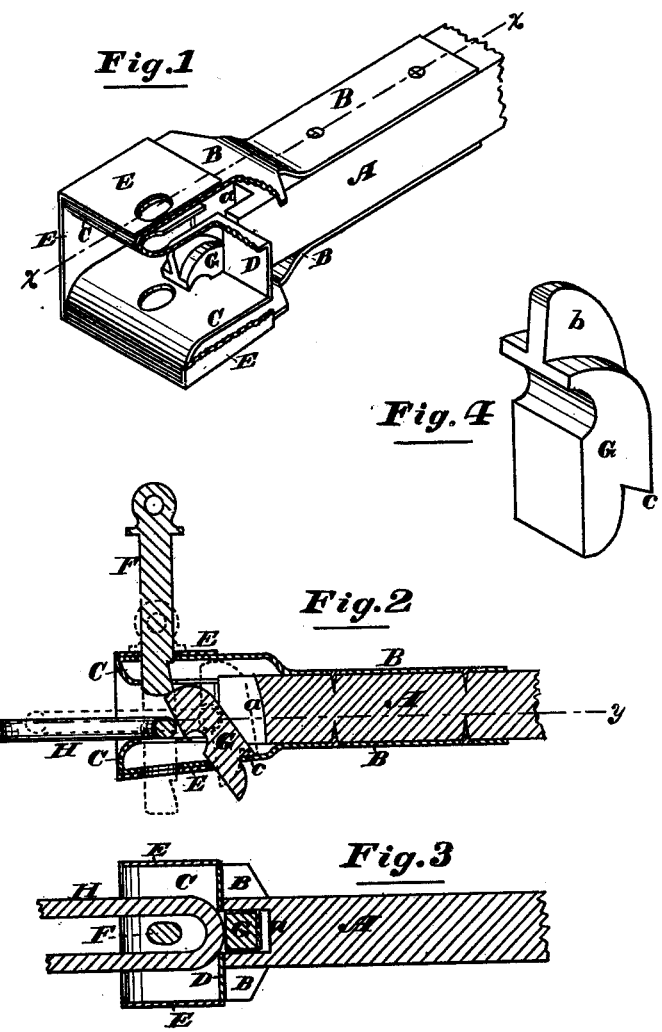
Attest
W. T. Baker
L. M. Harris
Inventor
E. T. Hopkins,
By Coburn & Thacher
Attorneys.

UNITED STATES PATENT OFFICE.

EDMUND T. HOPKINS, OF DAVENPORT, IOWA, ASSIGNOR TO ENOS CAR COUPLER COMPANY, OF SAME PLACE.

IMPROVEMENT IN CAR-COUPLINGS.

Specification forming part of Letters Patent No. 187,856, dated February 27, 1877; application filed November 2, 1876.

*To all whom it may concern:*

Be it known that I, EDMUND T. HOPKINS, of Davenport, in the county of Scott and the State of Iowa, have invented a new and useful Improvement in Car-Couplers, which is fully set forth in the following specification, reference being had to the accompanying drawings, in which—

Figure 1 represents a perspective view of a wrought-iron draw-bar, with a portion of the draw-head broken away to show the coupling device; Fig. 2, a longitudinal vertical section of the same, taken on the line $x\,x$, Fig. 1, with the coupling link and pin added; Fig. 3, a plan sectional view of the same, taken on the line $y\,y$, Fig. 2; and Fig. 4, a perspective view of the coupling tumbler or toggle.

The object of my invention is to apply the coupling devices shown and described in Letters Patent No. 150,309, granted to Joab Enos, April 28, 1874, to a wrought-iron draw-bar—that is, a draw bar and head made from ordinary bars of wrought metal. The draw-bar described and shown in Letters Patent No. 150,309 is of cast metal. On many railways, however, it is preferred to use wrought-iron draw-bars. These are made from bars of wrought-iron, and are of skeleton construction, so that it is difficult to apply a loose tumbler or toggle to the draw-head; and, in fact, up to the present time, to the best of my knowledge and belief, it has never before been done.

My invention consists in a peculiar construction and combination of the wrought-metal bars or plates composing the draw bar and head, as will be hereinafter more fully set forth; and, also, in the combination of the wrought-iron draw-bar thus constructed with a loose vibrating tumbler supported within the draw-head.

In the drawings, A represents the central portion or stock of the draw-bar, which is made of wood. Two bars or plates of wrought-iron, B B, are attached to the upper and lower sides, respectively, of the central stock A. These bars are widened and bent slightly upward at their forward ends, which project beyond the forward end of the wooden stock A, as shown in Fig. 1 of the drawings, and are folded back inwardly upon themselves, in the form shown in the drawings, the return folds C C being also bent, so as to form a vertical back, D, just in front of the forward end of the bar A, as shown in Figs. 1 and 2 of the drawings. The bars B, bent as described, to form the interior faces C and D, may be constructed in one piece, if desired; or the interior portion D may be made in a piece separate from the bars B, and secured to the front ends of the latter by welding or in any other suitable manner. A wide bar or band of wrought-iron, E, is slipped upon the forward ends of the bars B and welded thereto or securely fastened in any other suitable manner.

It will be seen that the encircling band E completes the draw-head, and that the latter is constructed with a flaring mouth and a large interior chamber, the band being as wide as the length of the sides C. The front ends of the band and plates are provided with suitable holes to receive the coupling-pin F. The interior plate C D is also slotted at its rear end, to receive a loose coupling-tumbler, G, and permit it to vibrate back and forth. This tumbler G is made of the form shown in Fig. 4 of the drawings, having a heavy upper end curved and projecting forward, so as to be hook-shaped, surmounted by a somewhat narrower flange or projection, $b$, which serves as a guide as it plays back and forth in the lateral slot in the upper plate C. The tumbler is also constructed with a rabbet upon its back side, so as to make a shoulder, $c$, from which the tumbler tapers to its lower end. The lower plate or bar B is slotted to receive the lower end of the tumbler G, but does not permit it to pass through its entire length, on account of the shoulder $c$, which is stopped by and rests upon that portion of the bar immediately in rear of the slot, as shown in Fig. 2 of the drawings.

The front end of the wooden stock A is constructed with a recess, $a$, which is immediately in rear of the opening in the back D, and is sufficiently large to receive the tumbler G whenever it is forced back. This tumbler G is less in thickness than the width of an ordinary coupling-link, and hence the opening in the back D is of less width than such ink, and will not permit the latter to pass beyond the back D into the recess *a* when in the ordinary position for coupling.

In coupling, the link H is held in a horizontal position in one draw-head by means of the weighted upper end of the tumbler, which hooks over the end of the link and holds it, the operation being the same as in the aforesaid Letters Patent No. 150,309. In the other draw-head the tumbler will be tilted forward into the chamber of the draw-head, in the position shown in Fig. 2 of the drawings, and the coupling-pin should be inserted in the holes in the upper end of the tumbler, as shown in the same figure. As the cars come together, the link H enters the mouth of the draw-head, and strikes the front side of the tumbler, which it drives back, thereby releasing the pin, which falls down through the link. Ordinarily, the link is driven back with considerable force, and consequently it will pass backward into the draw-head as far as possible, driving the tumbler G before it, which swings back into the recess *a* in the forward end of the wooden stock A. The link, however, will be stopped when it reaches the back D, as the opening is not sufficiently large to permit its passage farther in that direction. The relative position of the several parts at this moment is shown in dotted lines in Fig. 2 of the drawings, and also in Fig. 3.

The recess *a* being large enough to receive the tumbler G bodily, the latter is relieved from the shock of the link driven against it, which is received, instead, by the back plate D. The tumbler G is introduced into and removed from the draw-head through the open mouth of the latter.

As stated above, the draw-head has a wide flaring mouth, and as the tumbler G is entirely loose within the draw-head, the coupling-link has great freedom of motion, and, therefore, a draw-bar constructed as described may be used with cars of different heights, and, although provided with a self-coupling device, may be readily coupled to an ordinary draw-bar with the usual coupling link and pin.

The construction is simple, cheap, and strong, costing no more than a wrought-iron draw-bar of ordinary construction, while it possesses all the advantages of the automatic coupling heretofore used with cast draw-bars only.

Having thus described my invention, what I claim as new, and desire to secure by Letters Patent, is—

1. In a wrought-metal draw-bar, the upper and lower plates or bars B, bent inwardly to form the sides C and back D, as described, in combination with the inclosing-band E, to form a recessed or chambered draw-head, substantially as set forth.

2. The combination of the bars B, interior plates C D, slotted as described, and wooden stock or bar A, provided with a recess, *a*, at its forward end, substantially as and for the purpose set forth.

3. The combination of the wooden stock or bar A, wrought-metal plates B, bent to form the sides and back C and D, band E, and loose coupling-tumbler G, all constructed, arranged, and operating substantially as and for the purpose set forth.

E. T. HOPKINS.

Witnesses:
L. A. BUNTING,
L. M. HARRIS.